(Model.)
P. WIEDERER.
MIRROR.
No. 361,386. Patented Apr. 19, 1887.
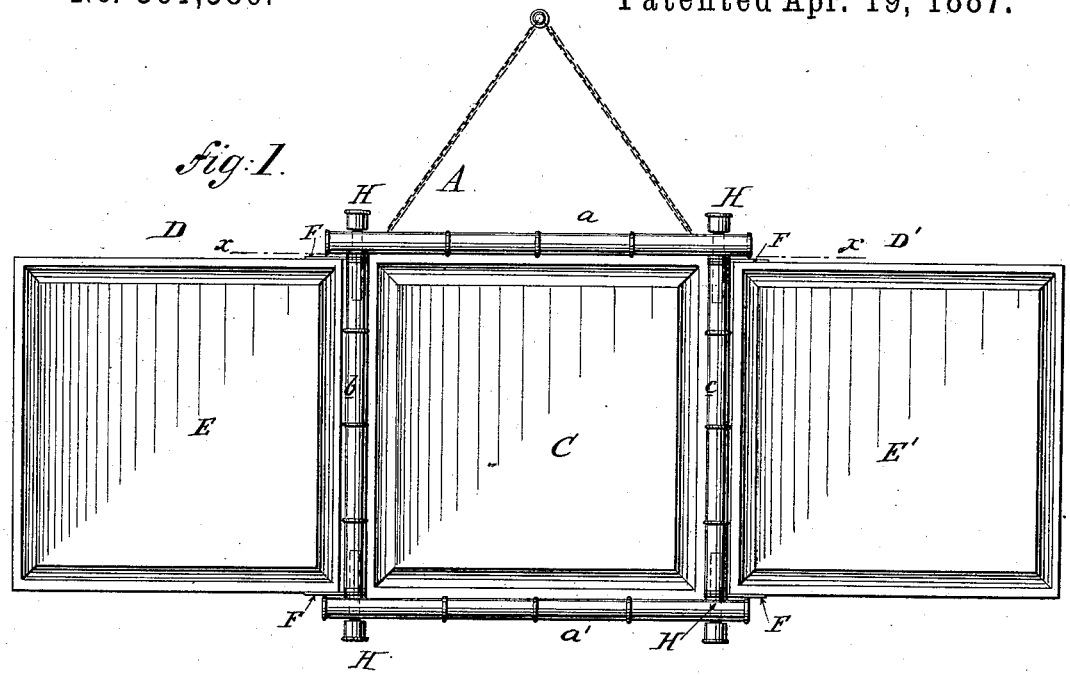
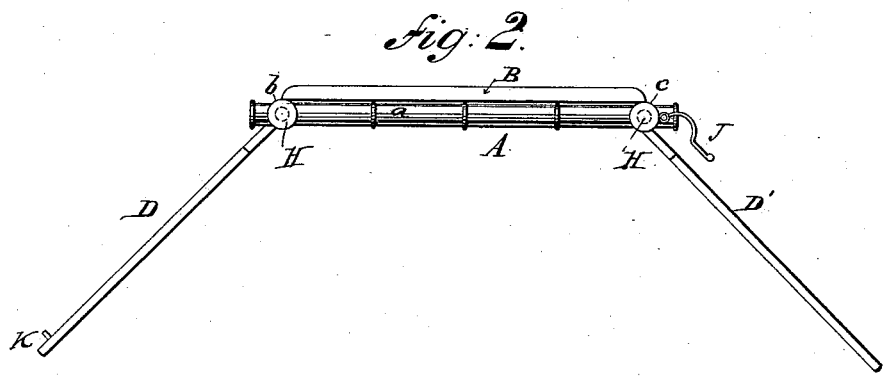
WITNESSES:
A. Schehl.
Carl Karp
INVENTOR
Peter Wiederer
BY
Goeuer Raegener
ATTORNEYS.

United States Patent Office.

PETER WIEDERER, OF STAPLETON, NEW YORK.

MIRROR.

SPECIFICATION forming part of Letters Patent No. 361,386, dated April 19, 1887.

Application filed January 15, 1887. Serial No. 224,405. (Model.)

*To all whom it may concern:*

Be it known that I, PETER WIEDERER, of Stapleton, in the county of Richmond and State of New York, have invented certain new and useful Improvements in Triplicate Folding Mirrors, of which the following is a specification.

This invention relates to improvements in that class of mirrors having three looking-glasses, of which two are adapted to fold upon the third, and by means of which looking-glasses the reflections can be multiplied, so as to enable the person to see the sides, back, and front of the head without requiring any change of position.

The invention consists in the combination, with a frame, of a backing attached to the same, a mirror held on said backing, and a swinging frame on each side of the frame to which the backing is attached, the swinging side frames carrying mirrors, and being adapted to fold over each other and upon the mirror fixed in the above-mentioned frame, all as will be fully described and set forth hereinafter, and finally be pointed out in the claim.

In the accompanying drawings, Figure 1 is a front view of my improved triplicate folding mirror, the same being open. Fig. 2 is a top view of the same. Fig. 3 is a horizontal sectional view on an enlarged scale on line $x\ x$, Fig. 1.

Similar letters of reference indicate corresponding parts.

The frame A, which is preferably made of imitation bamboo rods, is provided with detachable top and bottom pieces, $a\ a'$, and the side pieces, $b\ c$. The backing B is secured on the back of the frame A, and on the front of said backing the looking-glass or mirror C is held. To each piece $b\ c$ of the frame A a frame, D or D', is hinged, the sides of said frames being equal to the inner dimensions of the frame A. To the inner side of each frame D D' the mirrors E E', respectively, are fastened.

To the top and bottom of each frame D or D', a clip, F, is fastened, which clip is provided at its outer end with an eye, G, and through said eyes pivots H, having enlarged heads, are passed, which are also passed through the top and bottom pieces, $a\ a'$, at the ends, and are inserted into the ends of the side pieces, $b\ c$, so that the eyes turn on the ends of the side pieces of the frame A. Washers $e\ e$ are placed between the side pieces, $b\ c$, and the eyes G, and between the eyes G and the transverse top and bottom pieces, $a\ a$, for reducing the friction. In connecting the center frame with the side-mirror frames the washers and eyes at the lower parts of the frames D D' are first placed in position and the bottom piece, $a$, placed over the same, which is rigidly secured to the side pieces, $b\ c$, by the pivots H, that are glued, screwed, or otherwise fastened into the sockets at the ends of the side pieces, $b\ c$. In similar manner the pivotal connection of the main frame with the upper parts of the side frames is made. One of the swinging frames can be folded upon the mirror C, and the second swinging frame upon the first. The outer swinging frame has a latch, J, which can be engaged with a pin, K, and one of the side pieces of the frame A, for the purpose of holding the parts in place when the mirror is closed or folded.

I am aware that triplicate folding mirrors are not new, and do not claim them, broadly.

I am aware that it is not new to make looking-glasses consisting of a central mirror and additional wing mirrors hinged to the side pieces of the central mirror, and I do not claim this broadly.

Having thus described my invention, I claim as new and desire to secure by Letters Patent—

The combination of a main frame having a mirror supported at the back of the frame, said frame having detachable top and bottom pieces, folding side frames having mirrors and eye-clips at their upper and lower corners, and fixed pintles passing through the top and bottom pieces and eye-clips into sockets in the side pieces of the main frame, substantially as set forth.

In testimony that I claim the foregoing as my invention I have signed my name in presence of two subscribing witnesses.

PETER WIEDERER.

Witnesses:
PAUL GOEPEL,
MARTIN PETRY.